(12) United States Patent
Satou et al.

(10) Patent No.: US 8,949,068 B2
(45) Date of Patent: Feb. 3, 2015

(54) ROTATION ANGLE DETECTION DEVICE AND ELECTRIC POWER STEERING APPARATUS USING SAME

(75) Inventors: Takafumi Satou, Okazaki (JP); Nobuhiko Uryu, Kariya (JP)

(73) Assignee: Denso Corporation, Kariya (JP)

( * ) Notice: Subject to any disclaimer, the term of this patent is extended or adjusted under 35 U.S.C. 154(b) by 646 days.

(21) Appl. No.: 13/287,341

(22) Filed: Nov. 2, 2011

(65) Prior Publication Data

US 2012/0116717 A1     May 10, 2012

(30) Foreign Application Priority Data

Nov. 5, 2010 (JP) ................................ 2010-248123

(51) Int. Cl.
*G01D 5/244*     (2006.01)
(52) U.S. Cl.
CPC ................ *G01D 5/24457* (2013.01)
USPC ........................................................ 702/151
(58) Field of Classification Search
CPC ................................................. G01D 5/24457
USPC ........................................................ 702/151
See application file for complete search history.

(56) References Cited

U.S. PATENT DOCUMENTS

| | | | |
|---|---|---|---|
| 7,218,100 B1 * | 5/2007 | Matsumoto et al. | ..... 324/207.25 |
| 7,298,109 B2 * | 11/2007 | Sakamaki et al. | ............ 318/489 |
| 8,179,079 B2 * | 5/2012 | Mukai et al. | ................... 318/661 |
| 2008/0143325 A1 | 6/2008 | Sano | |
| 2012/0139532 A1 * | 6/2012 | Ueda et al. | ............... 324/207.22 |

FOREIGN PATENT DOCUMENTS

| | | |
|---|---|---|
| EP | 1 503 184 | 2/2005 |
| JP | 2006-105932 | 4/2006 |
| JP | 2008-128962 | 6/2008 |

OTHER PUBLICATIONS

Office Action dated Oct. 2, 2012 issued in corresponding Japanese Application No. 2010-248123 with English translation.
Office action dated Dec. 4, 2013 in corresponding Chinese Application No. 201110346293.5.

* cited by examiner

*Primary Examiner* — Sujoy Kundu
*Assistant Examiner* — Ricky Ngon
(74) *Attorney, Agent, or Firm* — Harness, Dickey & Pierce, PLC (57) ABSTRACT

A rotation angle detection device uses a control unit to acquire output signals $Vx1, Vx2, Vy1, Vy2$ that are from four half-bridges, from the four half-bridges. The control unit calculates a rotation angle $\theta$ of a detection target based on the acquired output signals $Vx1, Vx2, Vy1, Vy2$. The control unit checks whether a mean value fixation abnormality is caused to any one of the four output signals $Vx1, Vx2, Vy1, Vy2$, based on calculation values $C1$ or $C4$ that are derived/yielded from the four output signals $Vx1, Vx2, Vy1, Vy2$. The mean value fixation abnormality caused to the output signals $Vx1, Vx2, Vy1, Vy2$ that yielded the calculation values $C1$ and $C4$ is appropriately determined.

17 Claims, 5 Drawing Sheets

| | | | | |
|---|---|---|---|---|
| C1 | ○ | ○ | | |
| C2 | ○ | | | |
| C3 | | ○ | | |
| C4 | | | ○ | ○ |
| C5 | | | ○ | |
| C6 | | | | ○ |
| MEAN VALUE FIXATION | Vx1 | Vx2 | Vy1 | Vy2 |

| AREA | θ | \|Vy\|, \|Vx\| RELATION | SIGN OF Vy | SIGN OF Vx | φ CALCULATION | θ CALCULATION |
|---|---|---|---|---|---|---|
| 1 | 0 ≤ θ ≤ 45 | \|Vy\| ≤ \|Vx\| | ≥ 0 | ≥ 0 | tan | φ |
| 2 | 45 < θ ≤ 90 | \|Vy\| > \|Vx\| | ≥ 0 | ≥ 0 | cot | 90−φ |
| 3 | 90 < θ ≤ 135 | \|Vy\| > \|Vx\| | ≥ 0 | < 0 | cot | 90+φ |
| 4 | 135 < θ ≤ 180 | \|Vy\| ≤ \|Vx\| | ≥ 0 | < 0 | tan | 180−φ |
| 5 | 180 < θ ≤ 225 | \|Vy\| ≤ \|Vx\| | < 0 | < 0 | tan | 180+φ |
| 6 | 225 < θ ≤ 270 | \|Vy\| > \|Vx\| | < 0 | < 0 | cot | 270−φ |
| 7 | 270 < θ ≤ 315 | \|Vy\| > \|Vx\| | < 0 | ≥ 0 | cot | 270+φ |
| 8 | 315 < θ < 360 | \|Vy\| ≤ \|Vx\| | < 0 | ≥ 0 | tan | 360−φ |

US 8,949,068 B2

ROTATION ANGLE DETECTION DEVICE AND ELECTRIC POWER STEERING APPARATUS USING SAME

CROSS REFERENCE TO RELATED APPLICATION

This application is based on and incorporates herein by reference Japanese patent application No. 2010-248123 filed on Nov. 5, 2010.

FIELD OF THE INVENTION

The present invention generally relates to a rotation angle detection device for detecting a rotation angle of a rotary member and an electric power steering apparatus using the same.

BACKGROUND OF THE INVENTION

A conventional rotation angle detector detects a rotation angle of a shaft of a motor or the like, for example, based on an output signal from a sensor element. Further, the conventional rotation angle detector checks whether the output signal from the sensor element has an abnormality, for example, as disclosed in JP 2005-49097A (EP 1503184 A2).

In the conventional rotation angle detector, output signals from a bridge circuit, that is, a +sine signal, a −sine signal, a +cosine signal, a −cosine signal are input to an AD conversion unit after differential amplification. Therefore, if one of those signals has an abnormality, the rotation angle cannot be calculated.

In addition, if an operational amplifier to amplify the output signals is short-circuited, for example, a mean value fixation abnormality, in which the output signal is persistently fixed to a mean value, which is an intermediate or means value of a maximum value and a minimum value of an amplitude of a normal output signal, may occur.

SUMMARY OF THE INVENTION

It is an object of the present invention to provide a rotation angle detection device that appropriately detects a mean value fixation abnormality, in which a mean value of a maximum and a minimum of an amplitude of an output signal is continuously output, and an electric power steering device using such a rotation angle detection device.

According to the present invention, a rotation angle detection device is formed of a circuit part, an output signal acquisition part, a rotation angle calculation part and a mean value fixation check part. The circuit part has plural sensor element groups for sensing a rotating magnetic field from a detection target, in which impedance of each of sensor elements in the sensor element groups changes according to a rotation angle of the detection target. The output signal acquisition part acquires, from each of plural sensor element groups, an output signal. The rotation angle calculation part calculates a rotation angle of the detection target based on the output signal acquired by the output signal acquisition part. The mean value fixation check part checks whether a mean value fixation abnormality is caused based on a first value that is calculated by using the output signal acquired by the output signal acquisition part. The mean value fixation abnormality yields the output value continuously staying as a mean of a maximum value and a minimum value of an amplitude of the output signals that are used for the calculation of the first value.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE EMBODIMENT

Figure 1:
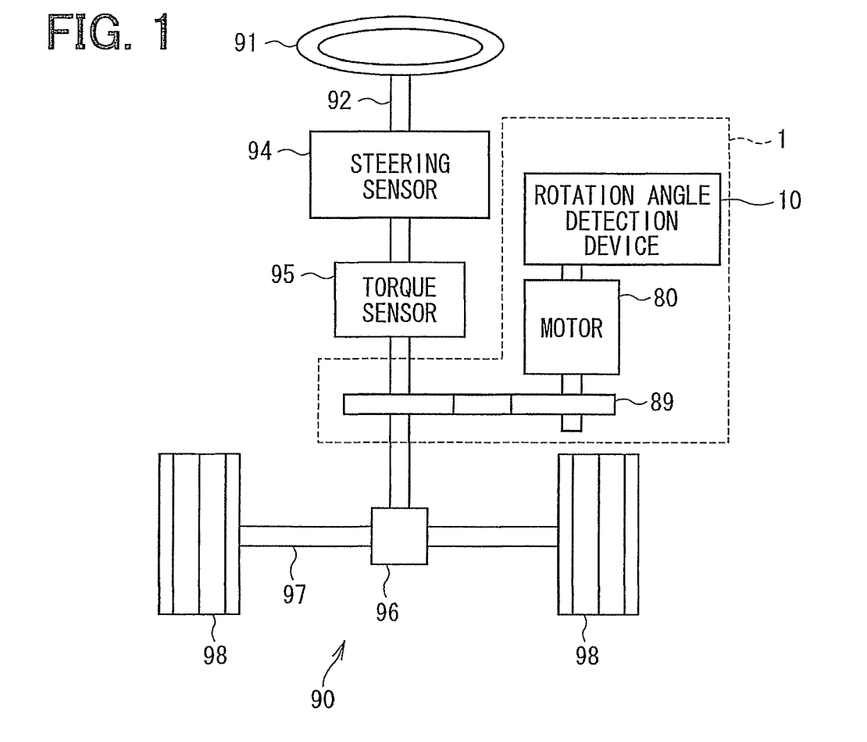
FIG. 1 is a schematic diagram of a steering system in an embodiment of the present invention.

Referring to FIG. 1, an electric power steering apparatus (EPS) 1 for assisting the steering operation of a vehicle, uses a rotation angle detection device 10 according to an embodiment of the present invention. The EPS 1 is provided in a steering system 90 of the vehicle.

In the steering system, a steering shaft 92 connected to a steering wheel 91 has a steering sensor 94 and a torque sensor 95 arranged thereon. The steering sensor 94 detects a rotation angle of the steering shaft 92. The torque sensor 95 detects a steering torque applied to the steering wheel 91. The end of the steering shaft 92 is connected through a gear 96 to a rack shaft 97. On both ends of the rack shaft 97, a pair of tire wheels 98 is respectively connected through a tie rod or the like. The rotating motion of the steering shaft 92 is converted into a linear motion of the rack shaft 97 by the gear 96, and the tire wheels 98 on the right and the left are steered by an angle that is in proportion to the displacement of the linear motion of the rack shaft 97.

The EPS 1 includes a motor 80 for generating a power assisting supplemental steering torque, the rotation angle detection device 10 for detecting the rotation angle of the motor 80, a gear 89 for reducing a speed of the rotation of the motor 80 and for transmitting the rotation to the steering shaft 92, together with other parts. The motor 80 is a three-phase brushless motor for a normal and reverse rotation of the gear 89. The EPS 1 transmits the supplemental steering torque according to a steering direction and a steering torque of the steering wheel 91 to the steering shaft 92.

Figure 2:
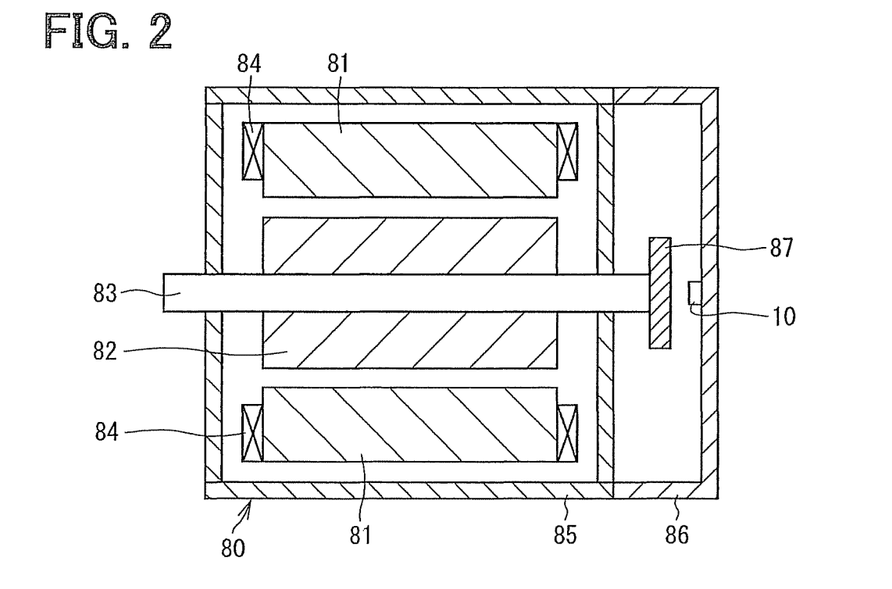
FIG. 2 is a cross-sectional view of a motor in the embodiment of the present invention.

As shown in FIG. 2, the motor 80 includes a stator 81, a rotor 82, a shaft 83 and the like. The rotor 82 is a cylindrical member, which rotates with the shaft 83. The rotor 82 has permanent magnets attached on its surface, and has magnetic poles. The rotor 82 is provided radially inside the stator 81 and supported rotatably therein relative to the stator 81. The stator 81 has protrusions, which protrude in a radially inward direction and are provided at an equi-angular distance. Coils 84 are wound about those protrusions. The rotor 82 rotates with the shaft 83, by receiving the magnetic field that is generated by the electric currents supplied to the coils 84. The stator 81, the rotor 82, the shaft 83 and the coils 84 are accommodated in a housing 85. The shaft 83 protrudes outward from both axial ends of the housing 85, and has a detection target 87 on one end on a cover 86 side. The detection target 87 is a member to be detected by the rotation angle detection device 10, and is accommodated within a cover 86. The detection target 87 is a two-pole magnet formed in a disk shape, and rotates together with the shaft 83. The rotation angle detection device 10 is attached to the cover 86 at a position that faces the detection target 87. Instead of providing only one rotation angle detection device 10, as described in the present embodiment, plural rotation angle detection devices may be provided at plural positions on the cover 86. The rotation angle detection device 10 detects the rotation angle of the detection target 87 that rotates together with the rotor 82 and the shaft 83 of the motor 80.

Figure 3:
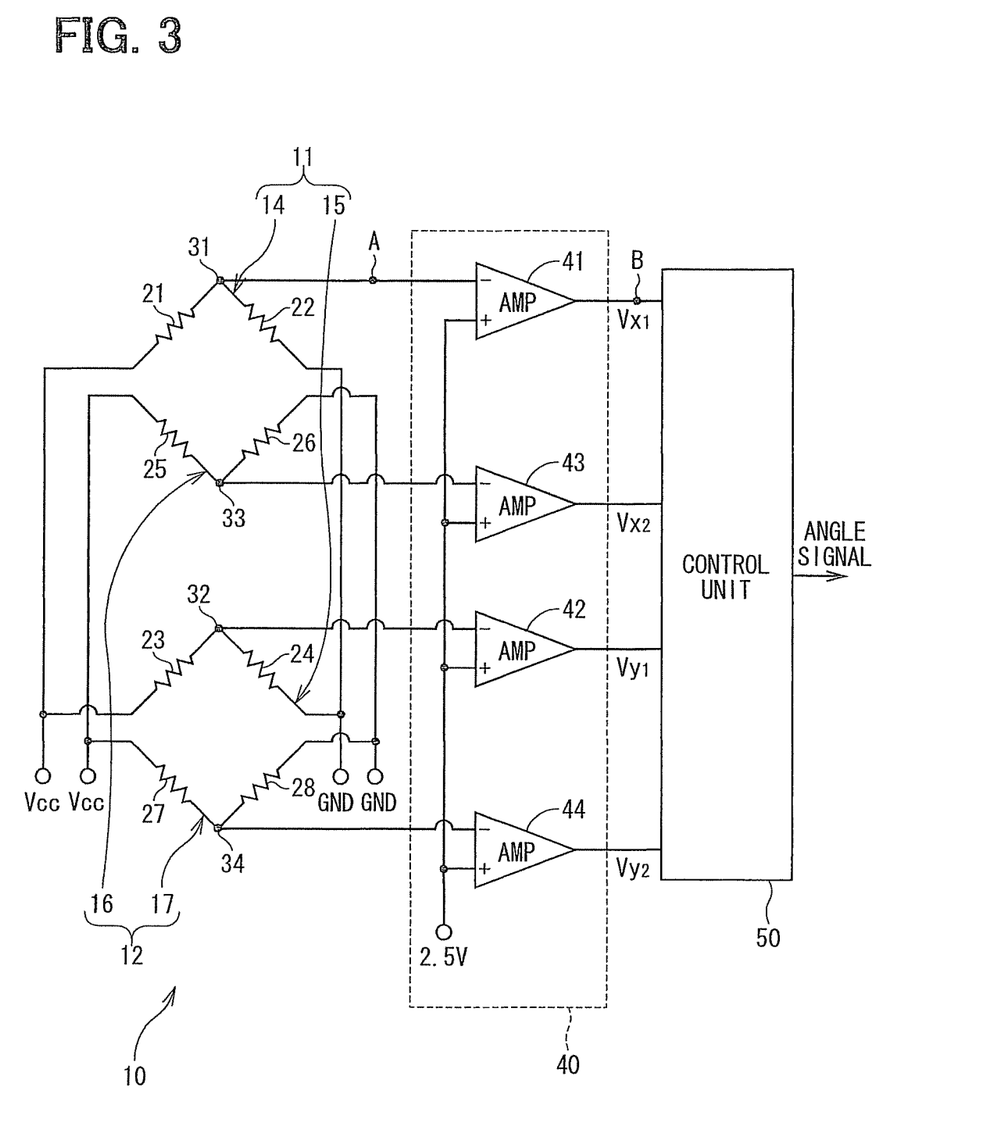
FIG. 3 is a circuit diagram of a rotation angle detection device in the embodiment of the present invention.

The rotation angle detection device 10 is configured as shown in FIG. 3. The rotation angle detection device 10 has a first bridge circuit 11, a second bridge circuit 12, an amplifier circuit 40, a control unit 50, and the like. The first bridge circuit 11 and the second bridge circuit 12 form a circuit part.

The first bridge circuit 11 has a first half-bridge 14 and a second half-bridge 15. The first half-bridge 14 is formed of two sensor elements 21 and 22. A junction 31 between the sensor elements 21 and 22 is connected to a first operational amplifier 41 of the amplifier circuit 40. The second half-bridge 15 is formed of two sensor elements 23 and 24. A junction 32 between the sensor elements 23 and 24 is connected to a second operational amplifier 42 of the amplifier circuit 40.

The second bridge circuit 12 has a third half-bridge 16 and a fourth half-bridge 17. The third half-bridge 16 is formed of two sensor elements 25 and 26. A junction 33 between the sensor elements 25 and 26 is connected to a third operational amplifier 43 of the amplifier circuit 40. The fourth half-bridge 17 is formed of two sensor elements 27 and 28. A junction 34 between the sensor elements 27 and 28 is connected to a fourth operational amplifier 44 of the amplifier circuit 40.

Each of the sensor elements 21 to 28 is a magneto-resistive element. The impedance of each magneto-resistive element changes in response to the rotating magnetic field, which changes with rotation of the detection target 87. A GMR element may preferably be used as the magneto-resistive element, for example.

Each of the half-bridges 14 to 17 forms a sensor element group. The sensor element group, which produces one output signal, is referred to as a half-bridge, for the sake of convenience. However, the number of sensor element groups (i.e., the number of half-bridges) in one bridge circuit may not necessarily be limited to two. Further, the number of sensor elements in one sensor element group may not necessarily be limited to two.

The sensor elements 21 to 28 are arranged so that the directions of magnetization of the first half-bridge 14 and the third half-bridge 16 are respectively shifted about 90° from the directions of magnetization of the second half-bridge 15 and the third half-bridge 17. The cosine signals are output from the junction 31 of the first half-bridge 14 and the junction 33 of the third half-bridge 16, and the sine signals are output from the junction 32 of the second half-bridge 15 and the junction 34 of the fourth half-bridge 17.

The first bridge circuit 11, which is formed of the first half-bridge 14 outputting the cosine signal and the second half-bridge 15 outputting the sine signal, and the second bridge circuit 12, which is formed of the third half-bridge 16 outputting the cosine signal and the fourth half-bridge 17 outputting the sine signal, are connected to respectively different power sources provided separately. Thus, even if one of the bridge circuits 11 and 12 fails, the rotation angle θ of the detection target 87 can be continuously calculated by using the cosine signal and the sine signal output from the other bridge circuit.

The amplifier circuit 40 includes the first amplifier 41, the second amplifier 42, the third amplifier 43 and the fourth amplifier 44.

The first amplifier 41 amplifies the cosine signal output from the junction 31 of the first half-bridge 14, and outputs an output signal Vx1, which is a positive cosine signal (+cos), to the control unit 50. The second amplifier 42 amplifies the signal output from the junction 32 of the second half-bridge 15, and outputs an output signal Vy1, which is a positive sine signal (+sin), to the control unit 50. The third amplifier 43 amplifies the signal output from the junction 33 of the third half-bridge 16, and outputs an output signal Vx2, which is a negative cosine signal (−cos), to the control unit 50. The fourth amplifier 44 amplifies the signal output from the junction 34 of the fourth half-bridge 17, and outputs an output signal Vy2, which is a negative sine signal (−sin), to the control unit 50.

In case that a power source voltage Vcc supplied to the rotation angle detection device 10 is 5V, the four output signals Vx1, Vx2, Vy1 and Vy2, which are amplified by the amplifier circuit 40 and output to the control unit 50, are represented by the following equations (1) to (4).

$$Vx1 = K \cos\theta + 2.5 \quad (1)$$

$$Vx2 = K \cos\theta + 2.5 \quad (2)$$

$$Vy1 = K \sin\theta + 2.5 \quad (3)$$

$$Vy2 = K \sin\theta + 2.5 \quad (4)$$

The output signals Vx1 and Vx2, which are cosine signals, may also be referred to as +cosine signal Vx1 and −cosine signal Vx2, respectively. Similarly, the output signals Vy1 and Vy2, which are sine signals, may also be referred to as +sine signal Vy1 and −sine signal Vy2, respectively.

The control unit 50 is implemented as a microcomputer, and acquires the output signals respectively from the junctions 31 to 34 of the half-bridges 14 to 17, as an output of respective half-bridges 14 to 17. Each of the output signals from the half-bridges 14 to 17 is separately amplified by the amplifier circuit 40, to be input to the control unit 50. That is, the output signal from one half-bridge is not subject to a process of addition, differential amplification and the like with any of the other output signals from the other half-bridges before the control unit 50 acquires the output signal. Further, the control unit 50 performs various processes such as a rotation angle calculation process, a mean value fixation check process and the like, based on the acquired output signals.

The checking of the mean value fixation abnormality, which continues to output a mean value of the amplitude of an output signal in a normal condition (i.e., an average of the maximum value and the minimum value of the output signal), is performed in the following manner. The mean value fixation abnormality is caused when, for example, the operational amplifiers 41 to 44 are short-circuited. More practically, if a short circuit between an amplifier input point A that is positioned between the half-bridge 14 and the operational amplifier 41 and an amplifier output point B that is positioned between the operational amplifier 41 and the control unit 50 is caused, that leads to the mean value fixation abnormality. Further, the mean value fixation abnormality may be caused due to an abnormality of the sensor elements 21 to 28. In the present embodiment, an output voltage of 2.5V is continuously output when the mean value fixation abnormality is caused, because the power supply voltage Vcc is 5V.

For checking and determination of the mean value fixation abnormality, the following six calculations of equations (11) to (16) are performed to have calculation values C1 to C6, based on the output signals Vx1, Vx2, Vy1 and Vy2 shown in the above equations of (1) to (4).

$$C1=(Vx1-2.5)+(Vx2-2.5) \quad (11)$$

$$C2=Vx1-2.5 \quad (12)$$

$$C3=Vx2-2.5 \quad (13)$$

$$C4=(Vy1-2.5)+(Vy2-2.5) \quad (14)$$

$$C5=Vy1-2.5 \quad (15)$$

$$C6=Vy2-2.5 \quad (16)$$

When the mean value fixation abnormality is not caused to any one of the output signals Vx1, Vx2, Vy1 or Vy2, the calculation values C1 to C6 take the following values.

$$C1=0 \quad (21)$$

$$C2=K \cos \theta \quad (22)$$

$$C3=-K \cos \theta \quad (23)$$

$$C4=0 \quad (24)$$

$$C5=K \sin \theta \quad (25)$$

$$C6=-K \sin \theta \quad (26)$$

These values are interpreted as follows. That is, when the calculation value C1 is in a predetermined range (first predetermined range), which includes 0, the calculation value C1 is normal, thereby it is determined that the +cosine signal Vx1 and the −cosine signal Vx2 used for the calculation of the calculation value C1 do not have the mean value fixation abnormality. If the calculation value C1 is not in the first predetermined range including 0, the calculation value C1 is abnormal, thereby it is determined that the +cosine signal Vx1 or the −cosine signal Vx2 used for the calculation of the calculation value C1 has the mean value fixation abnormality.

Further, when the calculation value C4 is in a predetermined range (second predetermined range), which includes 0, the calculation value C4 is normal, thereby it is determined that the +sine signal Vy1 and the −sine signal Vy2 used for the calculation of the calculation value C4 do not have the mean value fixation abnormality. If the calculation value C4 is not in the second predetermined range including 0, the calculation value C1 is abnormal, thereby it is determined that the +sine signal Vy1 and the −sine signal Vy2 for the calculation of the calculation value C4 has the mean value fixation abnormality.

Figure 4:
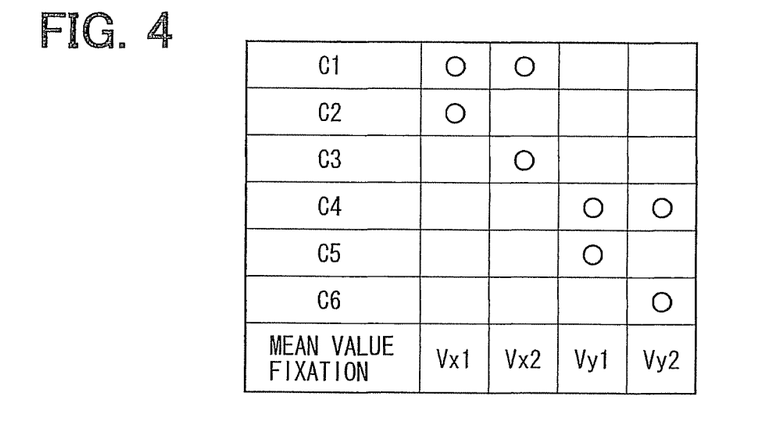
FIG. 4 is a table of a method of identifying an output signal which has a mean value fixation abnormality in the embodiment of the present invention.

A method of how the output signal having the mean value fixation abnormality is checked and identified is described with reference to the illustration in FIG. 4. In FIG. 4, the abnormal calculation value is indicated by using a circle mark "○."

If the calculation value C1 is an abnormal value, and the mean value fixation abnormality is caused to the +cosine signal Vx1, the calculation value C2 becomes 0. Therefore, if the calculation value C2 is in the third predetermined range including 0, the calculation value C2 is an abnormal value, and the +cosine signal Vx1, which is used for the calculation of the calculation value C2, is identified as having the mean value fixation abnormality.

If the calculation value C1 is an abnormal value, and the mean value fixation abnormality is caused to the −cosine signal Vx2, the calculation value C3 becomes 0. Therefore, when the calculation value C3 is in the third predetermined range including 0, the calculation value C3 is an abnormal value, and the −cosine signal Vx2, which is used for the calculation of the calculation value C3, is identified as having the mean value fixation abnormality.

If the calculation value C4 is an abnormal value, and the mean value fixation abnormality is caused to the +sine signal Vy1, the calculation value C5 becomes 0. Therefore, if the calculation value C5 is in the third predetermined range including 0, the calculation value C5 is an abnormal value, and the +sine signal Vy1 used for the calculation of the calculation value C5 is identified as having the mean value fixation abnormality.

If the calculation value C4 is an abnormal value, and the mean value fixation abnormality is caused to the −sine signal Vy2, the calculation value C6 becomes 0. Therefore, if the calculation value C6 is in the third predetermined range including 0, the calculation value C6 is an abnormal value, and the −sine signal Vy2 used for the calculation of the calculation value C6 is identified as having the mean value fixation abnormality.

In the present embodiment, the calculation value C1 is referred to as a first value and a cosine signal calculation value, and the calculation value C4 is also referred to a first value and a sine signal calculation value. The first predetermined range and the second predetermined range may be set to the same range or may be set to different ranges.

In addition, in the present embodiment, the calculation values C2, C3, C4 and C5 are referred to a second value and an output signal equivalent value. Further, the width of the third predetermined range regarding the abnormality determination of the calculation values C2, C3, C4 and C5 is a substantially smaller value than the amplitude K of the output signals Vx1, Vx2, Vy1 and Vy2. Further, the width of the third predetermined range regarding the abnormality determination of the calculation values C2, C3, C4 and C5 may be defined as a different value for each of those values C2, C3, C4 and C5. Further, the third predetermined range may be the same range as the first predetermined range and the second predetermined range, or it may be a different range from the first and second predetermined ranges.

In addition, each of the first predetermined range, the second predetermined range and the third predetermined range may be set to have a suitable value range, in consideration of the error of the sensors and the like.

Figure 5A:
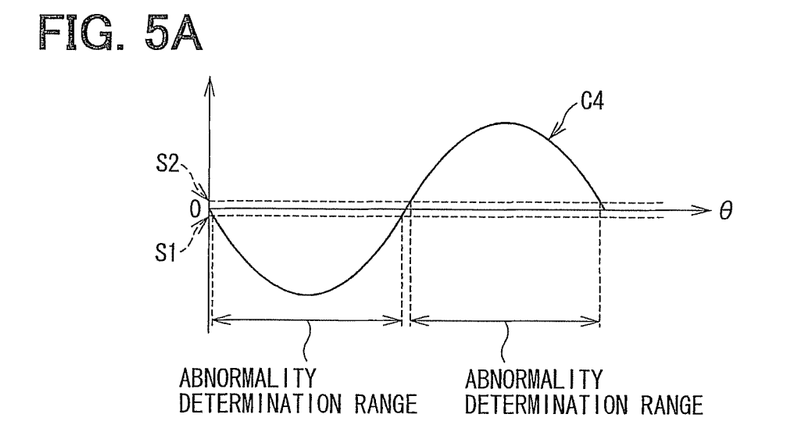
FIGS. 5A and 5B are signal waveform charts of an angle range in which the mean value fixation abnormality is determined in the embodiment of the present invention.
Figure 5B:
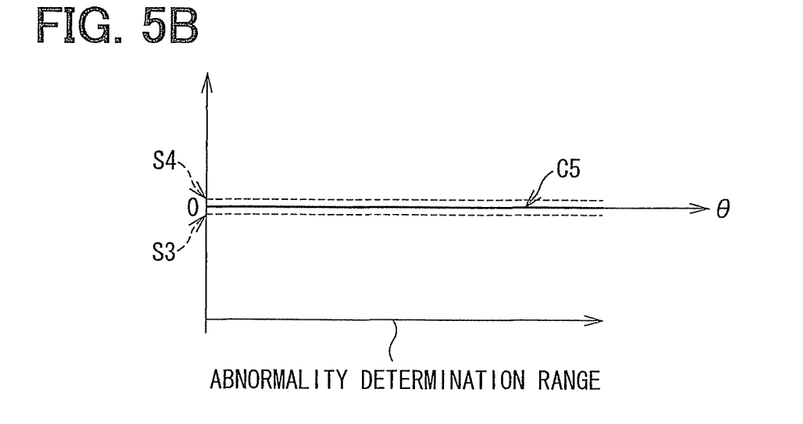

An example of the mean value fixation abnormality is described based on the illustrations in FIGS. 5A and 5B. Those illustrations show a situation that the mean value fixation abnormality is caused to the +sine signal Vy1, and, more specifically, FIG. 5A shows the calculation value C4, which is defined as (Vy1−2.5)+(Vy2−2.5), and FIG. 5B shows the calculation value C5, which is defined as Vy1−2.5.

If the mean value fixation abnormality is caused to the +sine signal Vy1 to have the fixation of the output signal to 2.5V, the calculation value C4 becomes −K sin θ as shown in FIG. 5A. If the minimum value of the second predetermined range is designated as S1 and the maximum value of the second predetermined range is designated as S2, the calculation value C4 is determined as an abnormal value in an angle range that causes the calculation value C4 to have a value smaller than S1 or a value greater than S2, which is close to 0, thereby it is determined that the +sine signal Vy1 or the −sine signal Vy2 has the mean value fixation abnormality.

In addition, if an absolute value of each of the values S1 and S2 is defined to be substantially smaller than the output signal amplitude K, an almost entire angle range leads to the determination that the calculation value C4 is abnormal, thereby it is determined that the +sine signal Vy1 or the −sine signal Vy2 has the mean value fixation abnormality.

In addition, if the calculation value C4 is close to 0, it is determined that the mean value fixation abnormality is not caused to the +sine signal Vy1 or to the −sine signal Vy2. In such angle range, the output signal being output when the mean value fixation abnormality is caused and the output signal being output if the mean value fixation abnormality is not caused are substantially the same. Therefore, in such a situation, even if the rotation angle calculation of the detection target 87 is performed based on the output signal having the mean value fixation abnormality, the calculated rotation angle is substantially correct, thereby causing no problem in terms of control of the EPS 1.

Further, if the mean value fixation abnormality is caused to the +sine signal Vy1 to have the fixation of the output signal to 2.5V, the calculation value C5 becomes 0, as shown in FIG. 5B. When the minimum value of the third predetermined range is designated as S3 and the maximum value of the third predetermined range is designated as S4, which is close to 0, the calculation value C5 is determined as an abnormal value since the calculation value C5 is in the third predetermined range, thereby it is determined that the +sine signal Vy1 used for the calculation of the calculation value C5 has the mean value fixation abnormality.

Figure 6:
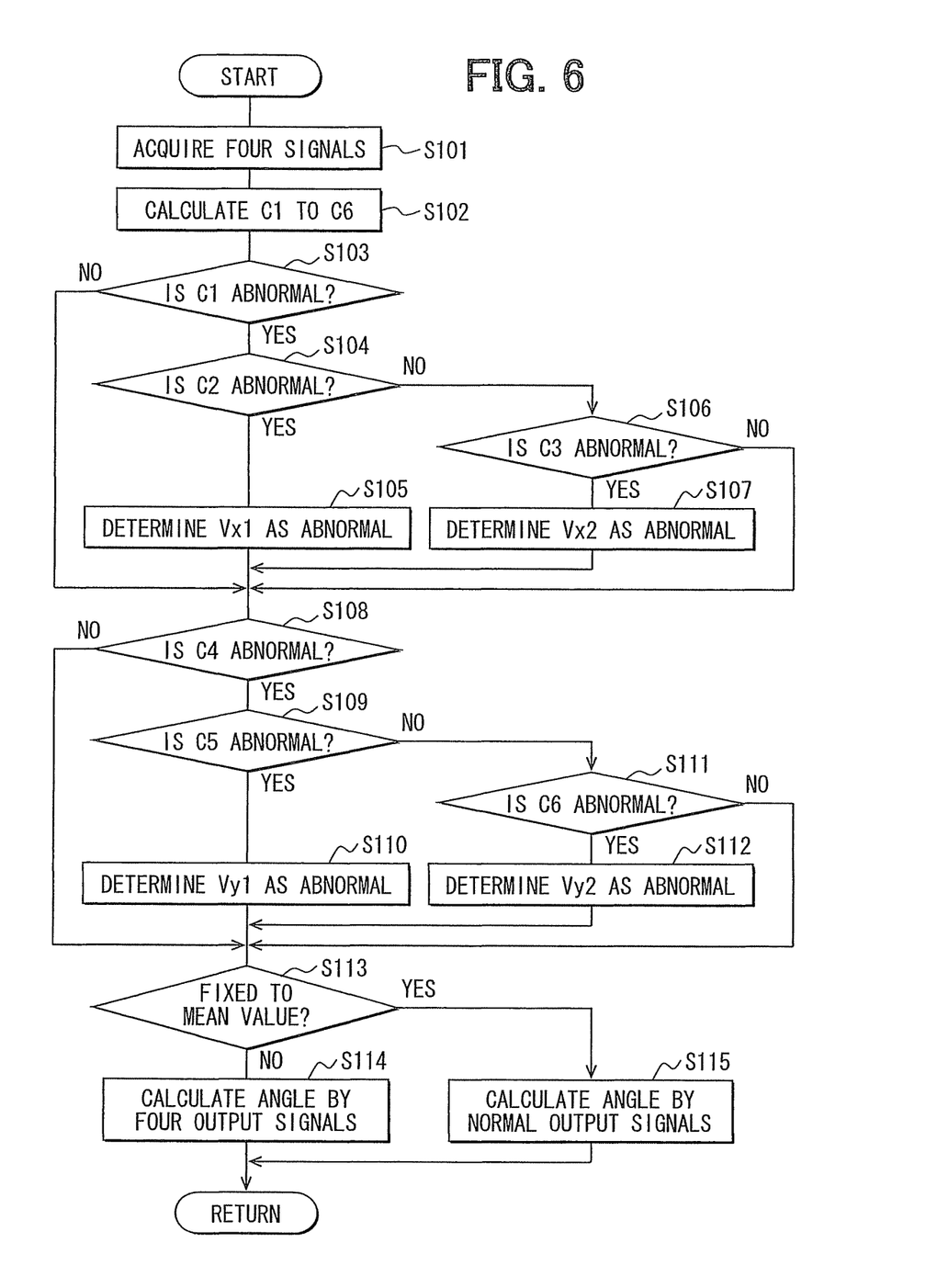
FIG. 6 is a flowchart of a mean value fixation determination process in the embodiment the present invention.

The mean value fixation check process for checking and determining the mean value fixation abnormality based on the calculation values C1 to C6 is further described based on the flowchart in FIG. 6. This check process is performed, for example, at a predetermined interval of every 200 μs by the control unit 50 while the EPS 1 is operated.

First, in S101, ("S" indicates a step), the four output signals Vx1, Vx2, Vy1 and Vy2 are acquired.

In S102, the calculation of the above equations (11) to (16) is performed, and the calculation values C1 to C6 are calculated.

In S103, it is checked whether the calculation value C1 is an abnormal value. If the calculation value C1 deviates from the first predetermined range including 0, the calculation value C1 is determined as an abnormal value. If it is determined that the calculation value C1 is not an abnormal value (S103:NO), it is determined that the mean value fixation abnormality is not caused to the +cosine signal Vx1 and to the −cosine signal Vx2 that are used for the calculation of the calculation value C1, and the process proceeds to S108. If it is determined that the calculation value C1 is an abnormal value (S103:YES), it is determined that the +cosine signal Vx1 or −cosine signal Vx2 that is used for the calculation of the calculation value C1 has the mean value fixation abnormality, and the process proceeds to S104.

In S104, it is checked whether the calculation value C2 is an abnormal value. When the calculation value C2 is in the third predetermined range including 0, the calculation value C2 is determined to be an abnormal value. If it is determined that the calculation value C2 is not an abnormal value (S104:NO), the process proceeds to S106. If it is determined that the calculation value C2 is an abnormal value (S104:YES), the process proceeds to S105.

Then, in S105, it is determined that the mean value fixation abnormality is caused to the +cosine signal Vx1 that is used for the calculation of the calculation value C2.

In S106, which follows the determination that the calculation value C2 is not an abnormal value (S104:NO), it is checked whether the calculation value C3 is an abnormal value. If the calculation value C3 is in the third predetermined range including 0, the calculation value C3 is determined as an abnormal value. If it is determined that the calculation value C3 is not an abnormal value (S106:NO), the process proceeds to S108. If it is determined that the calculation value C3 is an abnormal value (S106:YES), the process proceeds to S107.

Then, in S107, it is determined that the mean value fixation abnormality is caused to the −cosine signal Vx2 that is used for the calculation of the calculation value C3.

In S108, it is checked whether the calculation value C4 is an abnormal value. If the calculation value C4 deviates from the second predetermined range including 0, the calculation value C4 is determined as an abnormal value. If it is determined that the calculation value C4 is not an abnormal value (S108:NO), it is determined that the mean value fixation abnormality is not caused to the +sine signal Vy1 and to the −sine signal Vy2 that are used for the calculation of the calculation value C4, and the process proceeds to S113. If it is determined that the calculation value C4 is an abnormal value (S108:YES), it is determined that the +sine signal Vy1 or −sine signal Vy2 that is used for the calculation of the calculation value C4 has the mean value fixation abnormality, and the process proceeds to S109.

In S109, it is checked whether the calculation value C5 is an abnormal value. If the calculation value C5 is in the third predetermined range including 0, the calculation value C5 is determined to be an abnormal value. If it is determined that the calculation value C5 is not an abnormal value (S109:NO), the process proceeds to S111. If it is determined that the calculation value C5 is an abnormal value (S109:YES), the process proceeds to S110.

Then, in S110, it is determined that the mean value fixation abnormality is caused to the +sine signal Vy1 that is used for the calculation of the calculation value C5.

In S111, which follows the determination that the calculation value C5 is not an abnormal value (S109:NO), it is checked whether the calculation value C6 is an abnormal value. If the calculation value C6 is in the third predetermined range including 0, the calculation value C6 is determined as an abnormal value. When it is determined that the calculation value C6 is not an abnormal value (S111:NO), the process proceeds to S113. If it is determined that the calculation value C6 is an abnormal value (S111:YES), the process proceeds to S112.

Then, in S112, it is determined that the mean value fixation abnormality is caused to the −sine signal Vy2 that is used for the calculation of the calculation value C6.

In S113, it is checked whether there is any output signal which has the mean value fixation abnormality. If it is determined that there is the output signal which has the mean value fixation abnormality (S113:YES), the process proceeds to S115. If it is determined that no output signal has the mean value fixation abnormality (S113:NO), the process proceeds to S114.

In S114, four output signals are used to perform the angle calculation of the rotation angle θ of the detection target 87.

In S115, the rotation angle θ of the detection target 87 is calculated by using the output signals other than the output signal which is identified as having the mean value fixation abnormality.

The angle calculation method for calculating the rotation angle θ of the detection target 87 is described in the following.

If the mean value fixation is not caused to any one all output signals Vx1, Vx2, Vy1 and Vy2 (S113:NO), the angle calculation of the rotation angle θ of the detection target 87 is performed based on all four output signals Vx1, Vx2, Vy1 and Vy2 (S114). If the mean value fixation is not caused to any one of all output signals Vx1, Vx2, Vy1 and Vy2, the offset value is cancelled, as shown in the following equations, by subtracting a sine signal from the other sine signal, or by subtracting a cosine signal from the other cosine signal. In addition, by taking a difference of two signals (i.e., by the subtraction of the sine/cosine signals), not only the offset value but also the error due to the temperature characteristics is cancelled.

$$Vx1 - Vx2 = 2K \cos \theta \quad (31)$$

$$Vy1 - Vy2 = 2K \sin \theta \quad (32)$$

The rotation angle θ of the detection target 87 is calculated based on an angle φ that is calculated as an arctangent ($\tan^{-1}$, which is expressed as "arctan") by using equations (31) and (32). The method for calculating the rotation angle θ of the detection target 87 based on the angle φ is described later, with reference to FIGS. 7 and 8.

$$\phi = \arctan \{|(Vy1-Vy2)/(Vx1-Vx2)|\} \quad (33)$$

$$\phi = \arctan \{|(Vx1-Vx2)/(Vy1-Vy2)|\} \quad (34)$$

If the mean value fixation abnormality is caused (S113: YES), the angle calculation of the rotation angle θ of the detection target 87 is performed by using the abnormality-free output signals, which are free from the mean value fixation abnormality (S115). In the following example, it is assumed that the mean value fixation abnormality is caused to the output signal Vx1. The rotation angle θ can be calculated in the same manner when the other output signal has the mean value fixation abnormality.

If the mean value fixation abnormality is not caused to any one of all output signals Vx1, Vx2, Vy1 and Vy2, the offset value and the error due to the temperature characteristics are cancelled by the subtraction of the sine signals or the subtraction of the cosine signals, as described above. However, if the mean value fixation abnormality is caused to the output signal Vx1, it is not possible to cancel the offset value by subtraction of one cosine signal from the other. Therefore, an offset value of the −cosine signal Vx2, which is the cosine signal having no mean value fixation abnormality, is cancelled in the control unit 50.

$$Vx2a = Vx2 - 2.5 = -B \cos \theta$$

$$-2 Vx2a = 2B \cos \theta \quad (35)$$

The rotation angle θ of the detection target 87 is calculated based on the angle φ, which is an arctangent calculated based on the equations (32) and (35).

$$\phi = \arctan \{|(Vy1-Vy2)/(-2Vx2a)|\} \quad (36)$$

$$\phi = \arctan \{|(-2Vx2a)/(Vy1-Vy2)|\} \quad (37)$$

A calculation method of the rotation angle θ of the detection target 87 based on the angle φ, which is an arctangent calculated based on the sine signals and the cosine signals is explained in the following, with reference to FIGS. 7 and 8.

Figure 7:
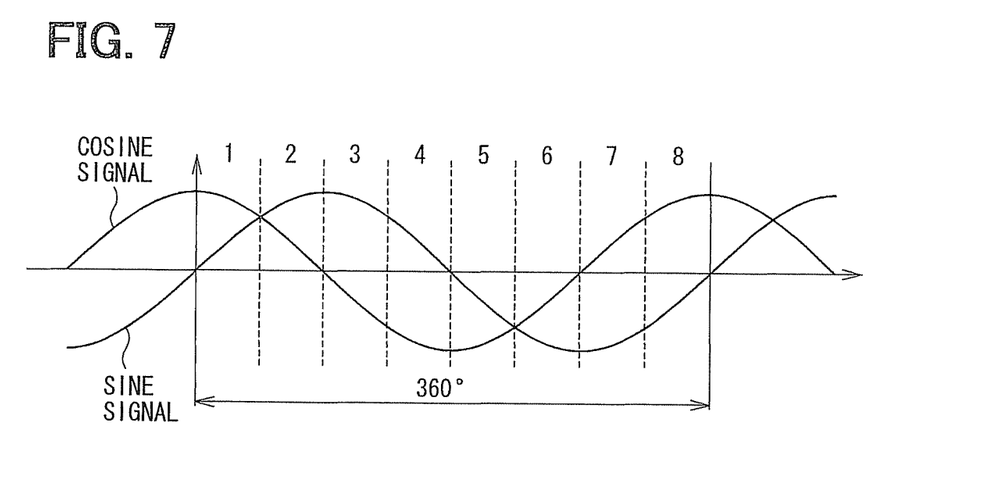
FIG. 7 is a waveform chart of division of a rotation angle for the calculation of a rotation angle of a detection target regarding a sine signal and a cosine signal in the embodiment of the present invention.
Figure 8:
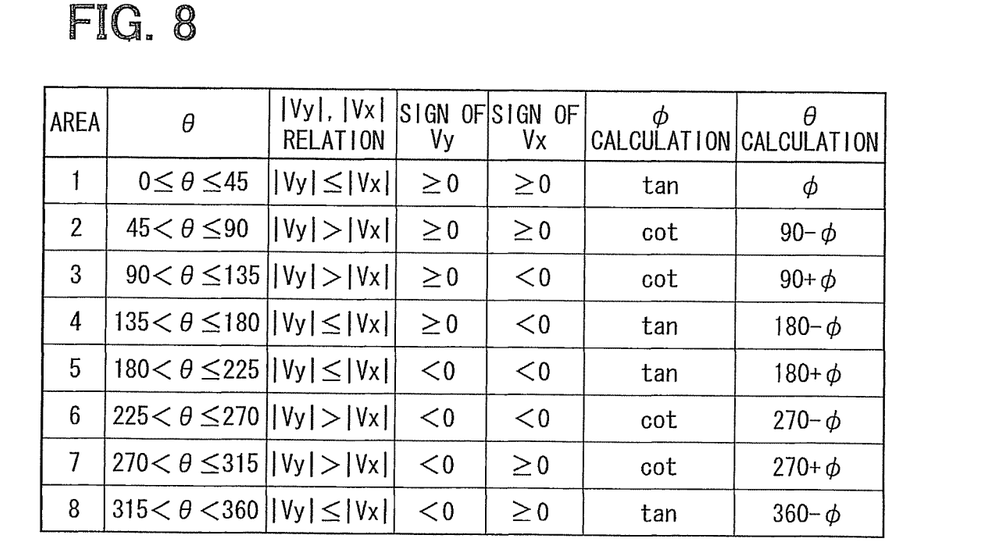
FIG. 8 is a table of a calculation method of the rotation angle of the detection target in the embodiment of the present invention.

FIG. 7 is an illustration, i.e., a graph, of the rotation angle θ of the sine signal and the cosine signal, relative to the divided angle ranges, and FIG. 8 is an illustration of a calculation method of the rotation angle of the detection target 87 based on the angle φ. In FIGS. 7 and 8, the angle range between 0 degree) (°) and 360 degrees is divided into eight ranges, and numerals 1 to 8 are respectively designated as an area (section) 1 to an area 8. Further, in FIG. 8, the sine signal is designated as Vy, and the cosine signal is designated as Vx.

First, if the sine signal and the cosine signal have respectively different amplitudes, the different amplitudes are matched with each other in one way or the other (see, for example, the equation (35)). Further, if the sine signal and the cosine signal are—(i.e., a negative) signals, the sign is reversed by multiplying −1 or the like (see, for example, the equation (35)).

The angle φ is calculated as an arctangent of a value that is calculated by dividing the sine signal by the cosine signal (i.e., tangent value) or arctangent of a value that is calculated by dividing the cosine signal by the sine signal (i.e., cotangent value), as shown in the equations (33), (34), (36) and (37). Since the sine signal and the cosine signal become 0 at certain angles and dividing by 0 should be avoided, the angle φ is calculated based on the tangent value that is derived from the division by the cosine signal when the sine signal is in an angle range of outputting 0, or the angle φ is calculated based on the cotangent value that is derived from the division by the sine signal when the cosine signal is in an angle range of outputting 0.

Further, in the rotation angle range between 0 degree and 360 degrees, the tangent value and the cotangent value take the same value at different rotation angles θ. Therefore, based on the magnitude relationship of the absolute values of the sine signal and the cosine signal, as well as the sign of the sine signal and the sign of the cosine signal, the range of the rotation angle θ is identified first, for the purpose of the calculation of the rotation angle θ based on the arctangent of the tangent value or the cotangent value.

More practically, as shown in FIGS. 7 and 8, based on the magnitude relationship between the absolute values of the amplitude-matched sine signal and cosine signal, as well as the sign of the sine signal and the sign of the cosine signal, the position of the rotation angle θ is identified in terms of which one of the area 1 to the area 8 the angle θ is included, which is derived by dividing the angle between 0 degree and 360 degrees. Then, after the comparison of the absolute values between the sine signal and the cosine signal, whichever of the sine signal and the cosine signal having the greater absolute value is used as a denominator, the angle φ is calculated as the arctangent of the tangent value or the cotangent value. Then, the rotation angle θ is calculated by either adding or subtracting the calculated angle φ to the reference angles of 0 degree (=360 degrees), 90 degrees, 180 degrees and 270 degrees, as shown in FIG. 8, since the rotation angle θ is already identified to be included in one of the area 1 to the area 8.

As described above in detail, the control unit 50 of the rotation angle detection device 10 acquires the output signals Vx1, Vx2, Vy1 and Vy2 from each of the half-bridges 14 to 17 (S101 in FIG. 6). Then, the control unit 50 calculates the rotation angle θ of the detection target 87 based on the acquired output signals Vx1, Vx2, Vy1 and Vy2 (S114, S115). Then, the control unit 50 checks, based on the calculation value C1 calculated based on the acquired output signals Vx1 and Vx2, whether the mean value fixation abnormality is caused to the output signal Vx1 or Vx2, which is used for the calculation of the calculation value C1 (S103). Further, the control unit 50 checks, based on the calculation value C4 calculated based on the acquired output signals Vy1 and Vy2, whether the mean value fixation abnormality is caused to the output signal Vy1 or Vy2, which is used for the calculation of the calculation value C4 (S108).

In the present embodiment, because the output signals from the half-bridges 14 to 17 are acquired from each of the half-bridges 14 to 17 without a process such as the differential amplification or the like, the output signals free from abnormality are used to perform various calculations, even if an abnormality is caused in one of those output signals. In addition, based on the calculation value C1 derived from the output signals Vx1 and Vx2 that are acquired from each of the half-bridges 14 to 17, or based on the calculation value C4 derived from the output signals Vy1 and Vy2 that are acquired from each of the half-bridges 14 to 17, whether the mean value fixation abnormality is caused or not is appropriately checked and determined.

In addition, the control unit 50 identifies which one of the output signals has the mean value fixation abnormality, based on the calculation value C2 which is derived from the acquired output signal Vx1, based on the calculation value C3 which is derived from the acquired output signal Vx2, based on the calculation value C5 which is derived from the acquired output signal Vy1, and based on the calculation value C6 which is derived from the acquired output signal Vy2 (S105, S107, S110, S112). In such a manner, the output signal which has the mean value fixation abnormality is identified appropriately, thereby preventing a false angle calculation.

The control unit 50 calculates the rotation angle θ of the detection target 87 based on the output signals other than the output signal which is identified as having the mean value fixation abnormality (S115). In such a manner, the calculation of the rotation angle θ of the detection target 87 is continued without calculating a false rotation angle.

In the present embodiment, four output signals Vx1, Vx2, Vy1 and Vy2 are acquired by the control unit 50. In such a manner, even when an abnormality is caused to a part of the four output signals Vx1, Vx2, Vy1 or Vy2, the calculation of the rotation angle θ of the detection target 87 is continued.

In addition, the output signal Vx1 is a +cosine signal, the output signal Vx2 is a −cosine signal, the output signal Vy1 is a +sine signal, and the output signal Vy2 is a −sine signal.

Therefore, even when an abnormality is caused to a part of the output signals, the calculation of the rotation angle of the detection target 87 is continued if (i) one of the +cosine signal Vx1 or the −cosine signal Vx2 is normal, and (ii) one of the +sine signal Vy1 or the −sine signal Vy2 is normal.

The calculation value C1 is a cosine signal calculation value calculated based on the +cosine signal Vx1 and the −cosine signal Vx2. In the present embodiment, the calculation value C1 is derived from addition of the +cosine signal Vx1 and the −cosine signal Vx2. Therefore, if the mean value fixation abnormality is not caused to the +cosine signal Vx1 and to the −cosine signal Vx2, the calculation value C1 becomes a constant value, that is, a value 0 in the present embodiment. When the calculation value C1 deviates from the first predetermined range, the control unit 50 determines that the mean value fixation abnormality is caused to the +cosine signal Vx1 or to the −cosine signal Vx2 (S103:YES). In such a manner, it is appropriately determined that either the +cosine signal Vx1 or the −cosine signal Vx2 has the mean value fixation abnormality by a simple calculation.

In addition, the calculation value C4 is a sine signal calculation value calculated based on the +sine signal Vy1 and the −sine signal Vy2. In the present embodiment, the calculation value C4 is derived from the addition of the +sine signal Vy1 and the −sine signal Vy2. Therefore, if the mean value fixation abnormality is not caused to the +sine signal Vy1 and to the −sine signal Vy2, the calculation value C4 takes a constant value, that is, a value 0 in the present embodiment. If the calculation value C4 deviates from the second predetermined range, the control unit 50 determines that the mean value fixation abnormality is caused to the +sine signal Vy1 or to the −sine signal Vy2 (S108:YES). In such a manner, it is appropriately determined that either the +sine signal Vy1 or the −sine signal Vy2 has the mean value fixation abnormality by a simple calculation.

The calculation values C2, C3, C5 and C6 are the output signal equivalent values that are respectively calculated by subtracting the predetermined offset value 2.5 from the output signals Vx1, Vx2, Vy1 and Vy2 in the present embodiment. Thus, the calculation value C2 becomes the +cosine signal when the output signal Vx1 does not have the mean value fixation abnormality, or the calculation value C2 becomes a constant, that is, 0 in the present embodiment, if the output signal Vx1 has the mean value fixation abnormality. Therefore, if the calculation value C2 is in the third predetermined range including 0 (S104:YES), the control unit 50 determines that the output signal Vx1 corresponding to the calculation value C2 has the mean value fixation abnormality (S105). Similarly, the calculation value C3 becomes the −cosine signal if the output signal Vx2 does not have the mean value fixation abnormality, or the calculation value C3 becomes a constant, that is, 0 in the present embodiment, if the output signal Vx2 has the mean value fixation abnormality. Therefore, if the calculation value C3 is in the third predetermined range including 0 (S106:YES), the control unit 50 determines that the output signal Vx2 corresponding to the calculation value C3 has the mean value fixation abnormality (S107). Further, the calculation value C5 becomes the +sine signal if the output signal Vy1 does not have the mean value fixation abnormality, or the calculation value C5 becomes a constant, that is, 0 in the present embodiment, if the output signal Vy1 has the mean value fixation abnormality. Therefore, if the calculation value C5 is in the third predetermined range including 0 (S109:YES), the control unit 50 determines that the output signal Vy1 corresponding to the calculation value C5 has the mean value fixation abnormality (S110). Furthermore, the calculation value C6 becomes the −sine signal if the output signal Vy2 does not have the mean value fixation abnormality, or the calculation value C6 becomes a constant, that is, 0 in the present embodiment, if the output signal Vy2 has the mean value fixation abnormality. Therefore, if the calculation value C6 is in the third predetermined range including 0 (S111:YES), the control unit 50 determines that the output signal Vy2 corresponding to the calculation value C6 has the mean value fixation abnormality (S112). In such a manner, the output signal having the mean value fixation abnormality can be identified by a simple method.

In the present embodiment, it is checked whether the mean value fixation abnormality is caused based on the six calculation values C1 to C6. If the abnormality is found, the output signal having the mean value fixation abnormality is identified based on such a determination result. Therefore, the output signal having the mean value fixation abnormality is identified by performing only a few calculations.

Further, in the present embodiment, the rotation angle detection device 10 is used in the EPS 1, and the rotation angle θ of the detection target 87 is calculated based only on the abnormality-free output signals that are free from the mean value fixation abnormality (i.e., excluding the output signal having the mean value fixation abnormality from the rotation angle calculation) if at least one of the output signals Vx1, Vx2, Vy1 and Vy2 is determined to have the mean value fixation abnormality. Therefore, even if a part of the output signals has the mean value fixation abnormality, the rotation angle θ of the detection target 87 is calculated substantially accurately, thereby allowing continuation of the steering assist operation by using the EPS 1.

In the present embodiment, the control unit 50 operates as an output signal acquisition part, a rotation angle calculation part, a mean value fixation determination part, and an abnormal signal identification part. Further, S101 of FIG. 6 is a process that serves as the function of an output signal acquisition part, and S114 and S115 are processes that serve as the function of a rotation angle calculation part, and S103 and S108 are processes that serve as the function of a mean value fixation determination part, and S105, S106, S110 and S112 are processes that serve as the function of an abnormal signal identification part.

Although the present invention has been fully described in connection with preferred embodiment thereof with reference to the accompanying drawings, it is to be noted that various changes and modifications in the following will become apparent to those skilled in the art.

(A) In the above embodiment, the second value is calculated by subtracting the predetermined value from the output signal. However, the second value may be calculated by adding a predetermined value to the output signal. Further, the second value may be the output signal itself.

(B) In the above embodiment, the cosine signal and the sine signal have the same amplitude of 1, and the offset value added in the amplifier circuit 40 is 2.5. However, the amplitude and the offset value may take different values, as long as the control unit 50 can accept such values as the output signal.

Further, in the above embodiment, the acquired +cosine signal, the acquired −cosine signal, the acquired +sine signal and the acquired −sine signal have the same amplitude. However, the amplitude of the acquired signal may take a different value, signal to signal. In such a case, if the amplitude of each output signal is known, the output signal having the mean value fixation abnormality can be identified, in the same manner as the above embodiment, by performing an adjustment process of the amplitude in the control unit 50.

(C) In the above embodiment, the rotation angle detection device 10 is provided with the amplifier circuit 40. However, the amplifier circuit 40 may be omitted, and an output signal from each of the half-bridges may be acquired directly by the control unit 50.

(D) In the above embodiment, the two bridge circuits 11 and 12 are connected to different power supplies. However, the two bridge circuits 11 and 12 may be connected to the same power supply. Further, the output signals acquired from one bridge circuit may be a +cosine signal and a −cosine signal, and the output signals acquired from the other bridge circuit may be a +sine signal and a −sine signal.

(E) In the above embodiment, the number of bridge circuits 11 and 12 is 2. However, the number of the bridge circuits may be 1, or the number of the bridge circuit may be 3 or more. Further, the number of output signals output from the half-bridge and acquired by the control unit may take any number as long as at least two signals having respectively different phases are included. Furthermore, plural output signals may be acquired from one half-bridge.

(F) In the above embodiment, the rotation angle detection device 10 is applied to the EPS 1. However, the rotation angle detection device 10 may also be applied to other fields and devices.

Such changes, modifications and summarized schemes are to be understood as being within the scope of the present invention as defined by appended claims.

What is claimed is:

1. A rotation angle detection device comprising:
a circuit part having plural sensor element groups for sensing a rotating magnetic field from a detection target, in which impedance of each of sensor elements in the sensor element groups changes according to a rotation angle of the detection target;
an output signal acquisition part for acquiring, from each of plural sensor element groups, an output signal;
a rotation angle calculation part for calculating a rotation angle of the detection target based on the output signal acquired by the output signal acquisition part;
a mean value fixation check part for checking whether a mean value fixation abnormality is caused based on a first value that is calculated by using the output signal acquired by the output signal acquisition part, the mean value fixation abnormality being determined by continuously outputting a mean value of a maximum value and a minimum value of an amplitude of the output signals that are used for the calculation of the first value in a normal condition; and
an abnormal signal identification part for identifying the output signal which has the mean value fixation abnormality based on a second value, the second value calculated based on the output signal acquired by the output signal acquisition part; wherein
the mean value fixation check part calculates, as the second value, one of the output signal itself and an output value equivalent value that is derived by adding or subtracting a predetermined value to or from the output value, respectively; and
the abnormal signal identification part determines that one of the output signal and the output signal corresponding to the output signal equivalent value has the mean value fixation abnormality if one of the output signal and the output signal equivalent value is within a predetermined range.

2. The rotation angle detection device of claim 1, wherein:
the rotation angle calculation part calculates the rotation angle of the detection target based on the output signals other than the output signal which is identified to have the mean value fixation abnormality.

3. The rotation angle detection device of claim 2, wherein:
the output signal acquisition part acquires at least four output signals.

4. The rotation angle detection device of claim 3, wherein:
the output signal acquisition part acquires a +cosine signal, a −cosine signal, a +sine signal and a −sine signal as the output signals.

5. The rotation angle detection device of claim 4, wherein:
the mean value fixation check part calculates, as the first value, a cosine signal calculation value based on the +cosine signal and the −cosine signal; and
the mean value fixation check part determines that one of the +cosine signal and the −cosine signal has the mean value fixation abnormality, if the cosine signal calculation value deviates from a predetermined range.

6. The rotation angle detection device of claim 4, wherein:
the mean value fixation check part calculates, as the first value, a sine signal calculation value based on the +sine signal and the −sine signal; and
the mean value fixation check part determines that one of the +sine signal and the −sine signal has the mean value fixation abnormality, if the sine signal calculation value deviates from a predetermined range.

7. The rotation angle detection device of claim 2, wherein:
the mean value fixation check part calculates, as the second value, one of the output signal itself and an output value equivalent value that is derived by adding or subtracting a predetermined value to or from the output value, respectively; and the abnormal signal identification part determines that one of the output signal and the output signal corresponding to the output signal equivalent value has the mean value fixation abnormality if one of the output signal and the output signal equivalent value is within a predetermined range.

8. The rotation angle detection device of claim 2, wherein:
a total number of the first values and the second values is at least six.

9. The rotation angle detection device of claim 2, wherein:
the circuit part is provided in a rotation angle detection device of a motor of an electric power steering apparatus.

10. The rotation angle detection device of claim 1, wherein:
the output signal acquisition part acquires at least four output signals.

11. The rotation angle detection device of claim 10, wherein:
the output signal acquisition part acquires a +cosine signal, a −cosine signal, a +sine signal and a −sine signal as the output signals.

12. The rotation angle detection device of claim 11, wherein:
the mean value fixation check part calculates, as the first value, a cosine signal calculation value based on the +cosine signal and the −cosine signal; and
the mean value fixation check part determines that one of the +cosine signal and the −cosine signal has the mean value fixation abnormality, if the cosine signal calculation value deviates from a predetermined range.

13. The rotation angle detection device of claim 12, wherein:
the mean value fixation check part calculates, as the first value, a sine signal calculation value based on the +sine signal and the −sine signal; and
the mean value fixation check part determines that one of the +sine signal and the −sine signal has the mean value fixation abnormality, if the sine signal calculation value deviates from a predetermined range.

14. The rotation angle detection device of claim 13, wherein:
the mean value fixation check part calculates, as the second value, one of the output signal itself and an output value equivalent value that is derived by adding or subtracting a predetermined value to or from the output value, respectively; and
the abnormal signal identification part determines that one of the output signal and the output signal corresponding to the output signal equivalent value has the mean value fixation abnormality if one of the output signal and the output signal equivalent value is within a predetermined range.

15. The rotation angle detection device of claim 11, wherein:
the mean value fixation check part calculates, as the first value, a sine signal calculation value based on the +sine signal and the −sine signal; and
the mean value fixation check part determines that one of the +sine signal and the −sine signal has the mean value fixation abnormality, if the sine signal calculation value deviates from a predetermined range.

16. The rotation angle detection device of claim 1, wherein:
a total number of the first values and the second values is at least six.

17. The rotation angle detection device of claim 1, wherein:
the circuit part is provided in a rotation angle detection device of a motor of an electric power steering apparatus.

* * * * *